(12) United States Patent
Stern et al.

(10) Patent No.: US 6,266,542 B1
(45) Date of Patent: Jul. 24, 2001

(54) ACCESSORY ALLOWING HANDS-FREE OPERATION OF A CELLULAR TELEPHONE

(75) Inventors: Trampas B. Stern; Matthew J. Murray, both of Raleigh, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/160,617

(22) Filed: Sep. 24, 1998

(51) Int. Cl.$^7$ ........................................................ H04B 1/38
(52) U.S. Cl. ............................ 455/569; 455/567; 455/572
(58) Field of Search ............................... 455/90, 575, 590, 455/557, 572, 573, 343, 569, 570, 567, 348, 349, 350; 379/428, 433

(56) References Cited

U.S. PATENT DOCUMENTS

| | | | | |
|---|---|---|---|---|
| 4,698,838 | * | 10/1987 | Ishikawa et al. ....................... | 455/90 |
| 5,301,224 | * | 4/1994 | Major ................................. | 379/433 |
| 5,367,556 | * | 11/1994 | Marui et al. ......................... | 455/343 |
| 5,404,391 | * | 4/1995 | Wavroch et al. ...................... | 379/59 |
| 5,487,182 | * | 1/1996 | Hansson .............................. | 455/90 |
| 5,561,712 | * | 10/1996 | Nishihara ............................ | 379/355 |
| 5,749,057 | * | 5/1998 | Takagi ................................ | 455/569 |
| 5,754,962 | * | 5/1998 | Griffin ................................ | 455/569 |
| 5,841,856 | * | 11/1998 | Ide ..................................... | 455/569 |
| 5,889,383 | * | 3/1999 | Teich .................................. | 455/550 |
| 5,924,044 | * | 7/1999 | Vannatta et al. ..................... | 455/556 |
| 5,953,674 | * | 9/1999 | Hutchison, IV ..................... | 455/557 |
| 6,002,949 | * | 12/1999 | Hawker et al. ...................... | 455/569 |
| 6,035,221 | * | 3/2000 | Snyder et al. ....................... | 455/569 |
| 6,097,943 | * | 8/2000 | Nordwall ............................ | 455/557 |

\* cited by examiner

*Primary Examiner*—William Trost
*Assistant Examiner*—Tilahun Gesesse
(74) *Attorney, Agent, or Firm*—Wood, Phillips, VanSanten, Clark & Mortimer

(57) ABSTRACT

An accessory unit for operation of a cellular telephone, including a casing, a microphone mounted to the casing, a first sound emitting element mounted to the casing for providing an audible alert signal, and a second sound emitting element mounted to the casing for providing voice communication. A vibrating element is mounted to the casing for providing a mechanical alert signal, and a connector port is connectable to the telephone for communicating received sound to the telephone and receiving voice communication from the telephone. The connector port also receives actuating signals for both the first sound emitting element and the vibrating element from the telephone. A gasket is between the microphone and both the second sound emitting element and the vibrating element, and selectively has a first stiffness when the second sound emitting element is providing voice communications, and a second stiffness greater than the first stiffness when the vibrating element is providing a mechanical alert signal. The gasket is a rheological material, which may be an electro-rheological material or a magneto-rheological material, and an actuator controls the stiffness of the gasket. The unit connector port is also adapted to receive power from a connected cellular telephone.

21 Claims, 3 Drawing Sheets

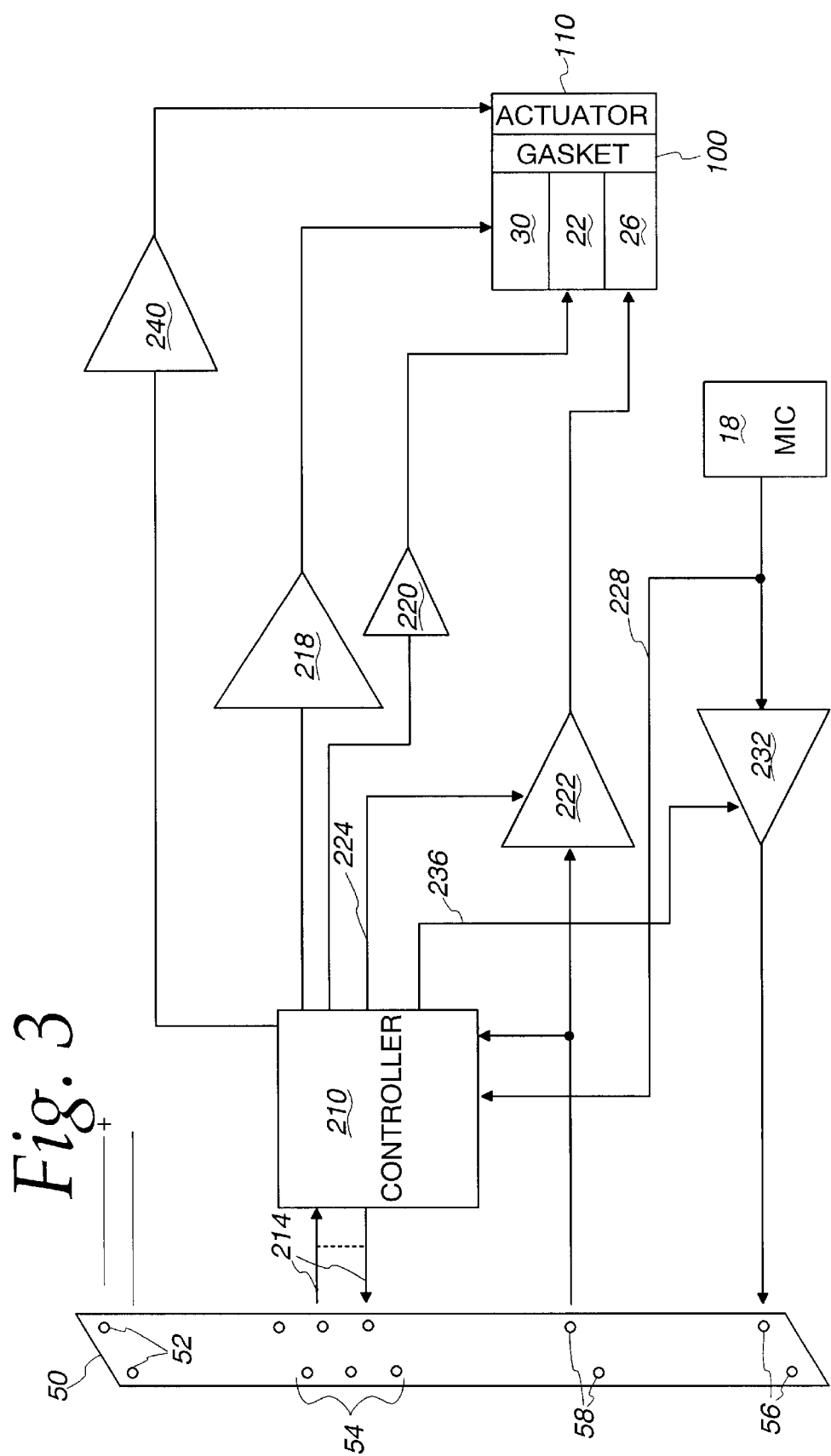

ACCESSORY ALLOWING HANDS-FREE OPERATION OF A CELLULAR TELEPHONE

BACKGROUND OF THE INVENTION

1. Technical Field

The present invention is directed toward cellular telephones, and more particularly toward an accessory for a cellular telephone.

2. Background Art

"Handsfree capability" for a cellular telephone is a feature which allows a user to operate a cellular telephone without requiring the user to hold the cellular telephone up to their head. Volume levels from the telephone are amplified allowing the user to hear sound emanating from the cellular telephone, and a microphone with greater sensitivity is used to receive the user's voice during a conversation. Handsfree capability in a cellular telephone yields advantages by freeing-up the hands of a user while the user is operating the cellular telephone. This leads to increased safety where a user is driving an automobile while operating a cellular telephone, and added convenience while a user is using a cellular telephone while attempting other work.

A "car cradle kit" allows handsfree operation by placing the cellular telephone into a 'cradle' which connects an external speaker and microphone to the system connector port for the cellular telephone. A user is then able to communicate to and receive communications from a party to which the cellular telephone is connected. However, the car cradle kit requires a power supply separate from the cellular telephone, and is not usable without the separate power supply. Further, car cradle kits are installed in a fixed location (e.g., a car) so that they are usable only at the installation location.

A cellular telephone that has been made with built-in handsfree capability uses the speaker and microphone present in the cellular telephone to communicate to and from a party to which the cellular telephone is connected. This cellular telephone has an infrared device which detects the distance of the cellular telephone from the user, and adjusts the volume of the telephone speaker accordingly. However, a malfunction with the infrared device could result in damage to the hearing of the cellular telephone's user.

Many cellular telephones also contain a gasket between the speaker and the microphone which isolate the speaker vibrations from the microphone to prevent feedback. This is particularly a problem with telephones with handsfree capability, given the higher speaker volumes and microphone sensitivity.

Additionally, most cellular telephones have an audible alert for an incoming telephone call. Such cellular telephones are difficult to use in both quiet and noisy areas. In areas where quiet is desired, such as a movie theater, a library, or a church, a user may turn the cellular telephone off to avoid offending others around them. In areas where it is noisy such as in a room crowded with people or an outdoor sporting event, a user may not hear the audible alert. In both situations, the user risks missing calls to the cellular telephone.

SUMMARY OF THE INVENTION

In one aspect of the present invention, a unit for operation of a cellular telephone is provided, including a casing enclosing the unit, a microphone mounted to the casing for receiving sound, a first sound emitting element mounted to the casing for providing an audible alert signal to a user, and a second sound emitting element mounted to the casing for providing voice communication to the user. The unit further includes a vibrating element mounted to the casing for providing a mechanical alert signal to the user and a connector port which is connectable to the cellular telephone for communicating received sound to the cellular telephone and receiving voice communication from a connected cellular telephone. The connector port is also adapted to receive actuating signals for both the first sound emitting element and the vibrating element from a connected cellular telephone.

In a preferred form, the unit has a gasket between the microphone and both the second sound emitting element and the vibrating element. The gasket has a first mode with a first stiffness when the second sound emitting element is providing voice communications, and a second mode with a second stiffness greater than the first stiffness when the vibrating element is providing the mechanical alert signal. Either the first mode or the second mode of the gasket may be a default mode. In another preferred form, the unit includes an actuator for placing the gasket into the state other than the default mode.

In still other preferred forms, the gasket contains a rheological material, with the actuator producing an electric current for electro-rheological material, or a magnetic field for magneto-rheological material.

In another preferred form, the first sound emitting element, the second sound emitting element, and the vibrating element are a unitary member.

In yet another preferred form, the unit is adapted to receive power from a connected cellular telephone through the connector port.

In another aspect of the present invention, a unit is provided including a casing enclosing the unit, a microphone mounted to the casing for receiving sound, a first sound emitting element mounted to the casing for receiving an audible alert signal to a user, and a second sound emitting element mounted to the casing for providing voice communication to the user. The unit also includes a first port connectable to the cellular telephone which is able to receive power from the cellular telephone when connected to the cellular telephone. The unit further includes a second port connectable to the cellular telephone for communicating received sound to the cellular telephone and receiving voice communication from a connected cellular telephone. The second port is also adapted to receive actuating signals for the first sound emitting element.

In a preferred form of this aspect of the present invention, the unit includes a gasket between the microphone and the first and second sound emitting elements. The gasket has a first mode with a first stiffness and a second mode with a second stiffness greater than the first stiffness. One of the first mode or second mode may be a default mode. In a further preferred form, the unit includes an actuator for placing the gasket into a mode other than the default mode.

In another aspect of the present invention, a communication unit comprises a microphone for receiving sound and connected to an indicator element having a sound emitting element and a vibrating element. A gasket between the microphone element and the indicator element has a first mode with a first stiffness and a second mode with a second stiffness greater than the first stiffness. One of the first and second modes of the gasket may be a default mode. The unit also includes an actuator for placing the gasket into the mode other than the default mode responsive to the state of the vibrating element.

In a preferred form, the gasket contains a rheological material, with the actuator producing an electric current for an electro-rheological material, and the actuator producing a magnetic field for a magneto-rheological material.

In another preferred form, the default mode is the first mode, and the actuator places the gasket in the second mode when the vibrating element is in an active state. In an alternate preferred form, the default mode of the gasket is the second mode, and the actuator places the gasket in the first mode when the sound emitting element emits sound.

Another aspect of the present invention is a method protecting a microphone from vibrations of a sound emitting element including the step of (1) responsive to a call alert signal, determining whether a mechanical alert is enabled. After step (1), if the mechanical alert is enabled, a mechanical connection between a microphone and a sound emitting element is placed in a first stiffness and the mechanical alert is activated. If the mechanical alert is not enabled after step (1), the mechanical connection located between a microphone and a sound emitting element is placed in a second stiffness less than the first stiffness, and an audible signal is sent to the sound emitting element.

BRIEF DESCRIPTION OF THE DRAWINGS

FIG. 3 is a schematic block diagram of the accessory unit of FIG. 1.

DESCRIPTION OF THE PREFERRED EMBODIMENT

Figure 1:
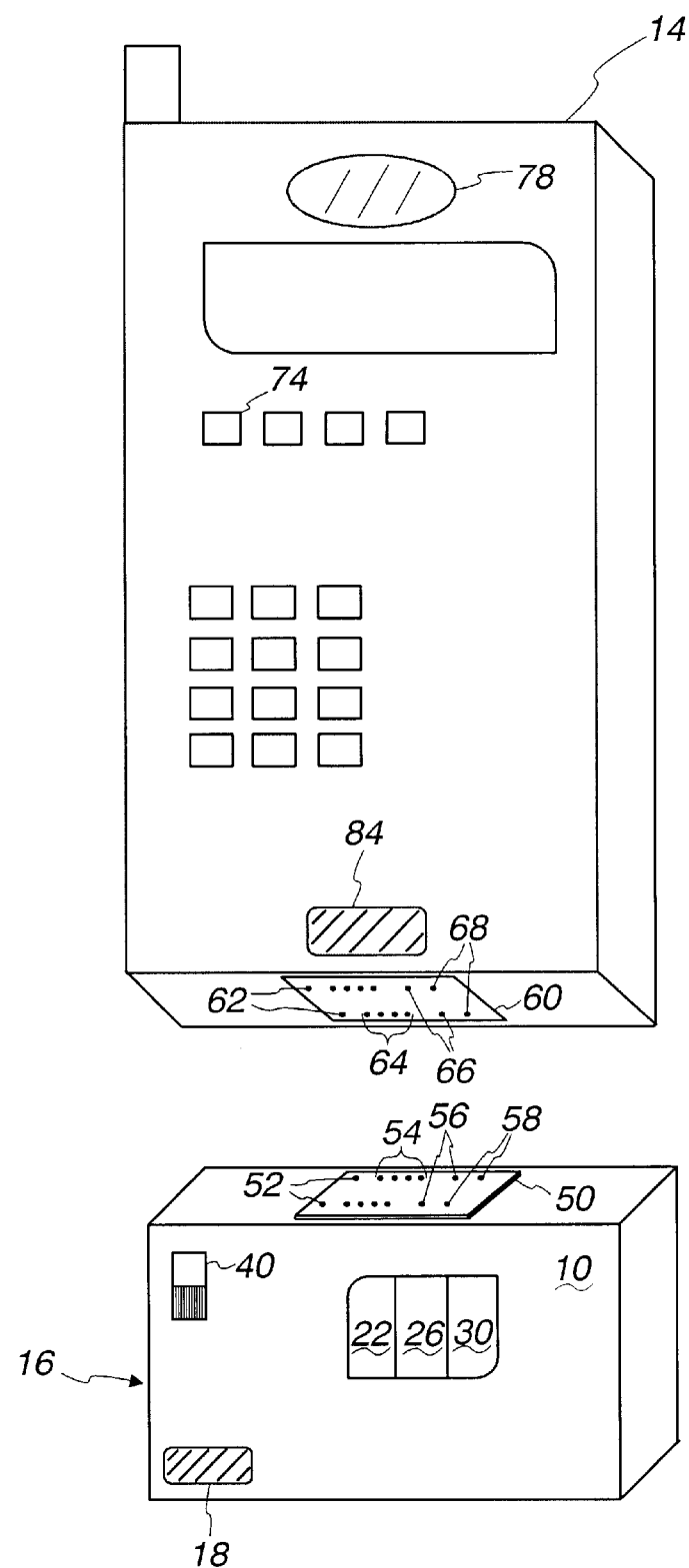
FIG. 1 is a perspective view of a preferred embodiment of a cellular telephone and an accessory unit including the present invention.

FIG. 1 shows an accessory unit 10 usable with a cellular telephone 14. The accessory unit 10 has a casing 16. A microphone 18 is connected to the casing 16 and is preferably sensitive enough to pick up conversational level sounds from a distance of several feet. A first sound emitting element 22, a second sound emitting element 26, and a vibrating element 30 are adapted to selectively provide an audible alert signal, voice communication, and a mechanical alert signal respectively to the user as described below. A switch 40 located on the accessory unit 10 enables/disables the mechanical alert signal. In an alternate embodiment, the first sound emitting element 22, the second sound emitting element 26 and the vibrating element 30 could be unitary in a tri-mode actuator such as is known in the art.

The accessory unit 10 has a connector port 50 for connecting into a system connector port 60 of a cellular telephone 14. Connector port 50 contains power sockets 52, data transfer sockets 54, accessory audio-out sockets 56, and accessory audio-in sockets 58. System connector port 60 contains power pins 62, data transfer pins 64, audio-out pins 66, and audio-in pins 68. It should be understood that the number and arrangement of these pins could be different than shown in FIG. 1, including locating sockets with the system connector port 60 and pins with the accessory unit connector port 50.

Cellular telephone 14 has a button 74 for answering a cellular telephone call, a speaker 78 for supplying voice communication to a user during normal operation, and a microphone 84 for receiving sound into the cellular telephone 14.

In operation, the connector port 50 of the accessory unit 10 is "plugged" into the system connector port 60 of the cellular telephone 14. The cellular telephone 14 preferably includes a suitable processor which determines that the second sound emitting element 26 and microphone 18 are attached and disables speaker 78 and microphone 84. Alternatively, a suitable switch could be provided for selecting between the telephone speaker 78 and microphone 84, and the accessory unit second sound emitting element 26 and microphone 18. Although accessory unit 10 is shown apart from cellular telephone 14 in FIG. 1 for the purpose of showing system connector port 60 and connector port 50, in operation the two are connected. In a further alternative embodiment, accessory unit 10 and cellular telephone 14 may utilize infra-red communication, where a physical connection between accessory unit 10 and cellular telephone 14 is not necessary. In this embodiment, accessory unit 10 would require its own internal power supply.

The connector port power sockets 52 are adapted to receive power from the power pins 62 of the system connector port 60 to power the accessory unit 10. Further, when the cellular telephone 14 receives an incoming call, the cellular telephone 14 sends a call alert signal over data transfer pins 64 to data transfer sockets 54, notifying the accessory unit 10 of an incoming call. A suitable controller unit in the accessory unit 10 (further described and shown in FIG. 2 and FIG. 3) determines if a mechanical alert feature is enabled (that is, determines the position of switch 40). If the mechanical alert feature is enabled, the vibrating element 30 vibrates, causing the accessory unit 10 to vibrate. This notifies the user of the cellular telephone of an incoming call without providing an audible alert signal, such as a ringing sound. If the mechanical call alert feature is not enabled, the controller unit provides an audible alert signal, usually a ringing sound, to the user through the first sound emitting element 22 to indicate an incoming call.

Once a call alert signal is received, the user begins a conversation by actuating the cellular telephone 14 such as by depressing button 74. If handsfree operation is selected, the user is then able to speak at conversational volume levels, as microphone 18 has sensitivity suitable for receiving the speech and transmitting it to accessory audio-out sockets 56 into audio-in pins 66 of the cellular telephone 14. When the cellular telephone 14 is receiving voice communication for the user, this communication is transmitted through audio-out pins 68 to accessory audio-in sockets 58 for the accessory unit 10. This voice communication is then emitted from second sound emitting element 26 which is a speaker suitable for handling increased audible power levels. In this manner, the user is able to carry on a conversation over the cellular telephone 14, using handsfree operation such that cellular telephone 14 need not be held up to the user's head.

As the accessory unit 10 is powered using the cellular telephone 14 from power pins 62 to power sockets 52, no separate power supply is required to power the accessory unit 10. Furthermore, because the accessory unit 10 does not require use of the cellular telephone speaker 78 or microphone 84, there is no danger of an infrared or other device controlling volume levels of a speaker in the cellular telephone 14 malfunctioning and potentially damaging the hearing of the cellular telephone 14 user. Further, even if a user makes a mistake and places the telephone 14 next to his ear to answer a call when in handsfree mode, the high volume voice communication from the second sound emitting element 26 will emit from the unit 10 located remotely from his ear and therefore will not damage his hearing. Still further, this allows for the cellular telephone 14 and the accessory unit 10 to provide fully portable handsfree operation. Also, as the accessory unit 10 is adaptable to fit into the system connector port 60 of existing cellular telephones, handsfree operation may be achieved without purchasing a new cellular telephone. All that need be purchased is the accessory unit 10.

Figure 2:
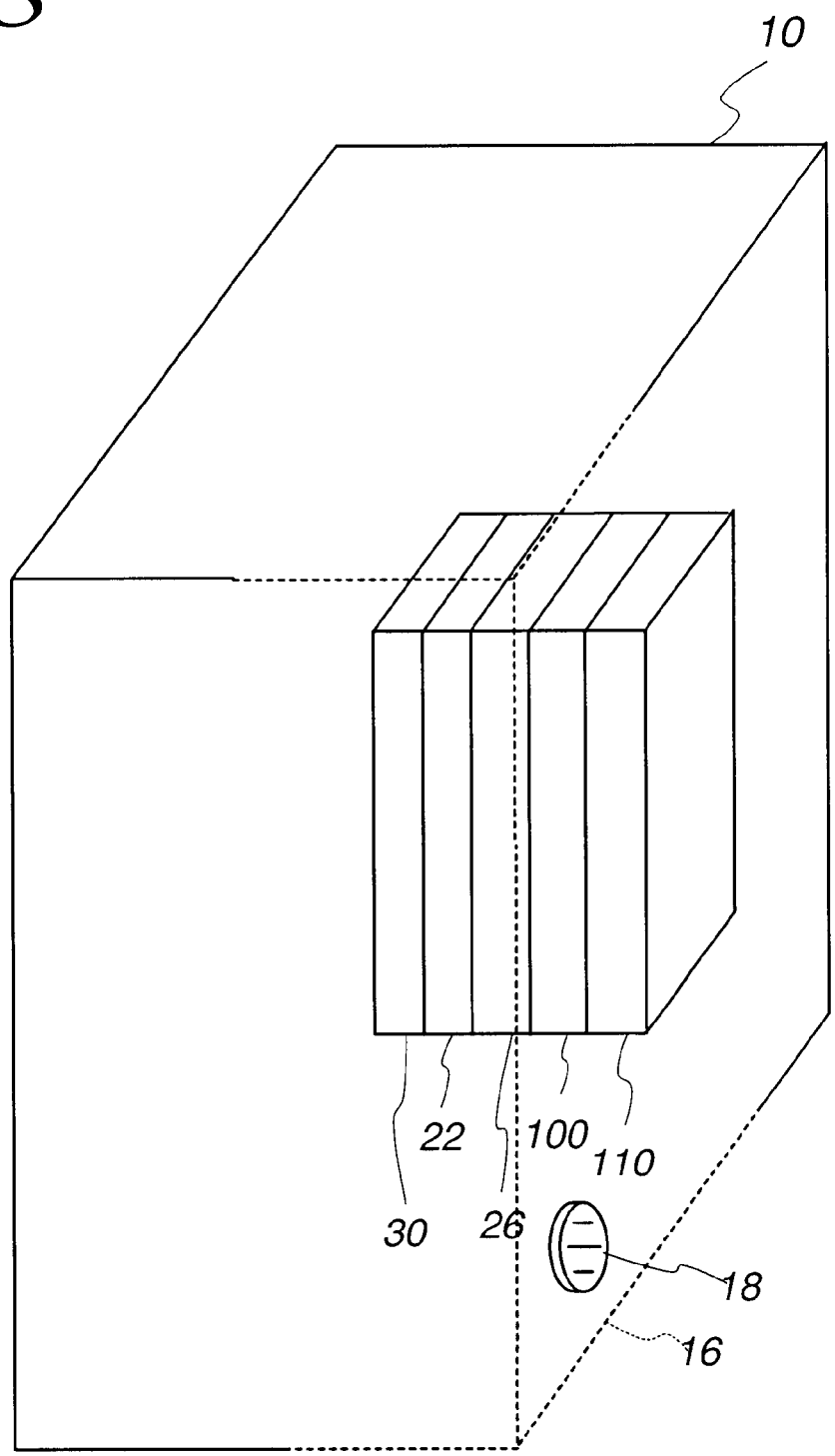
FIG. 2 is a partial view of the FIG. 1 embodiment showing one sound emitting element, the vibrating element, and the microphone.

The accessory unit 10 in a highly preferred form also contains capability for providing a mechanical alert signal to the user, thereby reducing the chance of missing cellular telephone calls in situations where low noise levels are required, or high noise levels are present. FIG. 2 illustrates an advantageous structure for providing such operation. All three of first sound emitting element 22, second sound emitting element 26 and vibrating element 30 are connected to a gasket 100. The gasket 100 is connected to an actuator 110 suitable for varying the stiffness of the gasket 100. The actuator 110 is connected to the casing 16 of the accessory unit 10. Microphone 18 is also connected to the casing 16.

In an alternate embodiment, the actuator may be placed anywhere that allows gasket 100 to be adequately affected by the actuator 110. The actuator 110 is shown as a block element. In a preferred embodiment, depending upon the gasket 100 as described below, the actuator 110 is a coil which produces a magnetic field. In an alternate preferred embodiment, the actuator 110 is a wire which delivers an electric current.

The gasket 100 contains a rheological material which may be an electro-rheological material or a magneto-rheological material, such as are known in the art, which allow the gasket 100 to vary from a first stiffness to a second stiffness. In the preferred embodiment, the first stiffness of gasket 100 is suitable for providing mechanical isolation between second sound emitting element 26 and microphone 18 to prevent feedback. The second stiffness of gasket 100, greater than the first stiffness, is suitable for efficiently transferring the mechanical alert signal from the vibrating element 30 to the casing 16 of the accessory unit 10.

If the gasket 100 contains an electro-rheological material, the actuator 110 actuates by transferring a suitable electric current through gasket 100 to vary the stiffness of gasket 100 from the first stiffness to the second stiffness. If the gasket 100 contains a magneto-rheological material, the actuator 110 produces a suitable magnetic field to vary the stiffness of gasket 100 from the first stiffness to the second stiffness.

In the preferred embodiment, when the vibrating element 30 is set to provide a mechanical alert signal, the actuator 110 is suitably controlled to cause the stiffness of gasket 100 to change from the first (lower) stiffness to the second (higher) stiffness. On the other hand, when the second sound emitting element 26 is providing voice communications to a user, the actuator 110 is not activated and the gasket 100 will therefore remain in the first (lower) stiffness to provide suitable mechanical isolation between the second sound emitting element 26 and the microphone 18 to prevent feedback in the accessory unit 10. When the first sound emitting element 22 is providing an audible alert to the user (usually ringing), the gasket 100 may be in either the first stiffness or the second stiffness since mechanical isolation is not necessary as both the microphone 18 and the vibrating element 30 are inactive. It is preferable in this case to leave the gasket 100 in its default condition to preserve the battery life of cellular telephone 14.

In the preferred embodiment, the default mode of gasket 100 is the first stiffness and is changed to the second stiffness when suitably actuated by actuator 110. This is desirable since for the majority of the time, the gasket 100 will be in the first stiffness (i.e., the lesser stiffness providing mechanical isolation). Since this stiffness requires no power when the gasket includes rheological material such as the disclosed preferred embodiment, the gasket will require no power for the majority of the time. However, the default mode for gasket 100 may be the second stiffness, with the actuator 110 acting to change the stiffness of gasket 100 to the first stiffness.

The gasket 100 controlled in this manner is thus highly advantageous as it transfers the mechanical energy from the vibrating element 30 when the accessory unit 10 is providing the mechanical alert to the user (thereby ensuring that the user will feel the vibration), while adequately isolating the second sound emitting element 26 from the microphone 18 when the second sound emitting element 26 is providing voice communication to the user (thereby isolating vibrations from the second sound emitting element 26 to prevent feedback through the microphone 18). The gasket 100 may also be useful in a cellular telephone with mechanical alert capability. For example, the gasket 100 may be used in cellular telephone 14 to prevent feedback between the microphone element 84 and the speaker 78, while allowing mechanical energy to be transferred to a casing of the cellular telephone 14 when a mechanical alert signal is being provided. In this case, the gasket 100 is placed between the casing of the cellular telephone 14 and a tri-mode actuator, which serves as the speaker 78, a vibrating element, and a buzzer for the cellular telephone 14. The gasket 100 remains in a lower stiffness to prevent feedback between the tri-mode actuator and the microphone element 84 when the tri-mode actuator is providing voice communications to a user. When the tri-mode actuator is providing a mechanical alert signal to the user, the gasket 100 is placed into a higher stiffness by a suitable actuator, thereby allowing the mechanical energy to be transmitted to a casing of the cellular telephone 14.

FIG. 3 is a schematic block diagram of the accessory unit of FIG. 1. The data transfer sockets 54 are connected to a controller, or central processing unit (CPU) 210 via serial data lines 214. The CPU 210 is connected through amplifier 218 to vibrating element 30. The CPU 210 is connected through amplifier 220 to the first sound emitting element 22.

Accessory unit audio-in sockets 58 are connected to the second sound emitting element 26 through amplifier 222. The CPU 210 is connected to amplifier 222 through an amplifier enable line 224 which allows the amplifier 222 to amplify a received signal from accessory audio-in sockets 58 and transmit the received signal to the second sound emitting element 26.

The CPU 210 is connected to the microphone 18 through level detection line 228, which detects the level of a signal received by the microphone 18. The microphone 18 is connected to the accessory unit audio-out sockets 56 through amplifier 232. The CPU 210 is connected to amplifier 232 through enable line 236, which controls the amplification of a microphone signal received at microphone 18, and thereby allows the microphone signal to be suitably transmitted to accessory audio-out socket 56.

The actuator 110 is connected to the gasket 100 which is connected to first sound emitting element 22, second sound emitting element 26 and vibrating element 30. CPU 210 is connected to actuator 110 through amplifier 240.

Power sockets 52 receive power into the accessory unit 10 from the connected cellular telephone 14. The connector port 50 is connected to the system connector port 60 (see FIG. 1) of cellular telephone 14.

In operation, the CPU 210 receives serial data from the cellular telephone 14 through data transfer sockets 54 via serial data lines 214 and determines whether the serial data indicates an incoming call. If the serial data indicates an incoming call, CPU 210 then determines if the mechanical alert (vibrating element 30) is enabled by switch 40. If the vibrating element 30 is enabled, the CPU 210 sends a signal to the amplifier 240 to actuate the actuator 110 to stiffen the gasket 100 and also sends a signal to the amplifier 218 to activate the vibrating element 30. The stiffened gasket 100 is suitable for transferring the mechanical energy from the vibrating element 30 to the casing 16 of the accessory unit 10, thereby providing an unmistakable mechanical alert of an incoming call to the user. If, on the other hand, the mechanical alert is not enabled, the CPU 210 does not send a signal to the actuator 110, and instead sends a signal to amplifier 220 to activate first sound emitting element 22 to provide an audible alert signal, usually a ringing sound, to alternatively indicate an incoming call.

Alternatively, switch 40 may be selectable to provide the user with a choice of allowing both mechanical and audible alert signals to indicate an incoming call, or a choice of providing neither a mechanical nor an audible alert signal to the user. In the former case, CPU 210 activates actuator 110 to stiffen gasket 100. CPU 210 then activates vibration element 30 (as discussed supra) to provide the mechanical alert signal while simultaneously activating the first sound emitting element 22 (as discussed supra) to provide an audible alert signal. In the latter case, CPU 210 may activate some alternate suitable incoming call indicator (not shown), or CPU 210 may disable all incoming call indicators.

When the call is answered (for example, by pressing button 74), the CPU 210 stops sending a signal through amplifier 240, thereby causing the actuator 110 to stop stiffening the gasket 100, which then returns to the first stiffness. The CPU 210 then sends a signal over amplifier enable line 224, enabling the amplifier 222 to amplify the voice communication received at accessory audio-in sockets 58 and transmit it to second sound emitting element 26, which is suitable for providing voice communication which the user can hear from several feet away.

When the microphone 18 receives sound during the call, the CPU 210 detects the level of the received sound over level detection line 228 and sends a signal over enable line 236 to control the amplification of amplifier 232. The received sound from the microphone 18 is thereby transmitted through accessory audio-out sockets 56 to the connected cellular telephone 14.

In this manner, the accessory unit 10 is able to cause either a vibrating element 30 or a first sound emitting element 22 to alert a user of a call, and once the cellular telephone 14 is activated and a conversation is started, the CPU 210 allows voice communication from the cellular telephone 14 to be heard from the second sound emitting element 26, and sound received into the microphone 18 to be transmitted to cellular telephone 14 through connector port 50 for transmission to the caller.

The accessory unit 10 of the present invention thus allows handsfree operation of a cellular telephone utilizing the cellular telephone power supply, eliminating the requirement of a separate power supply. As the accessory unit is separate from the cellular telephone and compatible with the system connector port on the cellular telephone, it is usable with existing cellular telephones. Therefore, a new cellular telephone need not be purchased to receive handsfree operation of a cellular telephone. Depending on the cellular telephone software, the cellular telephone and/or its software may need to be adapted to be used with the accessory unit 10. Furthermore, as the cellular telephone speaker element is not used for the handsfree operation, there is no risk of a malfunction which might cause hearing damage to a user. Still further, since the speaker emitting high volume sounds is located at the opposite end of the phone from the regular phone speaker, if a user were to mistakenly place the phone by his ear when the phone is set for handsfree operation, the high volume sound will emit remote from his ear, alerting him to his mistake without damaging his hearing. Further, because a mechanical alert signal is provided using a vibrating element in the accessory unit, less cellular telephone calls will be missed when the user is in places with high noise level, or where low noise levels are desirable. Additionally, the selectively variable stiffness of the gasket allows the mechanical alert signal to be reliably transferred through the unit casing, while also maintaining adequate mechanical isolation between the second sound emitting element and the microphone to prevent feedback while voice communication is being received by the user.

Still other aspects, objects and advantages of the present invention can be obtained from a study of the specification, the drawings, and the appended claims. It should be understood, however, that the present invention could be used in alternate forms where less than all of the objects and advantages of the present invention and preferred embodiment as described above would be obtained.

We claim:

1. A unit for allowing hands-free operation of a cellular telephone, the unit comprising:
   a casing enclosing the unit;
   a microphone mounted to the casing for receiving sound;
   a first sound emitting element mounted to the casing for providing an audible alert signal to a user;
   a second sound emitting element, mounted to the casing for providing voice communication to the user;
   a vibrating element mounted to the casing for providing a mechanical alert signal to the user; and
   a connector port, connectable to the cellular telephone for communicating received sound to the cellular telephone and receiving said voice communication from a connected cellular telephone, said port also adapted to receive actuating signals for both said first sound emitting element and said vibrating element from a connected cellular telephone.

2. The unit of claim 1 further comprising a gasket between the microphone and both the second sound emitting element and vibrating element, said gasket having a first mode with a first stiffness when the second sound emitting element is providing voice communications, and a second mode with a stiffness greater than the first stiffness when the vibrating element is providing the mechanical alert signal, one of said first and second mode being a default mode.

3. The unit of claim 2 further comprising an actuator for placing the gasket into the mode other than the default mode.

4. The unit of claim 3 wherein the gasket contains a rheological material.

5. The unit of claim 4 wherein the rheological material is an electro-rheological material and the actuator produces an electric current.

6. The unit of claim 4 wherein the rheological material is a magneto-rheological material and the actuator produces a magnetic field.

7. The unit of claim 1 wherein said connector port is adapted to receive power from a connected cellular telephone.

8. The unit of claim 1 wherein said first sound emitting element, said second sound emitting element, and said vibrating element are a unitary member.

9. A unit for providing handsfree operation of a cellular telephone, the unit comprising:

a casing enclosing the unit;

a microphone mounted to the casing for receiving sound;

a first sound emitting element mounted to the casing for providing an audible alerting signal to a user;

a second sound emitting element mounted to the casing for providing voice communication to the user;

a first port connectable to the cellular telephone, said first port including a power input for receiving power from the cellular telephone for operating said microphone and said first and second sound emitting elements when connected to the cellular telephone; and a second port connectable to the cellular telephone, said second port for communicating received sound to the cellular telephone and receiving said voice communication from a connected cellular telephone, said second port also adapted to receive actuating signals for said first sound emitting element.

10. A unit for providing handsfree operation of a cellular telephone, the unit comprising:

a casing enclosing the unit;

a microphone mounted to the casing for receiving sound;

a first sound emitting element mounted to the casing for providing an audible alerting signal to a user;

a second sound emitting element mounted to the casing for providing voice communication to the user;

a gasket between the microphone and the first and second sound emitting elements;

a first port connectable to the cellular telephone, said first port including a power input for receiving power from the cellular telephone when connected to the cellular telephone; and a second port connectable to the cellular telephone, said second port for communicating received sound to the cellular telephone and receiving said voice communication from a connected cellular telephone, said second port also adapted to receive actuating signals for said first sound emitting element.

11. The unit of claim 10 wherein said gasket has a first mode with a first stiffness and a second mode with a second stiffness greater than the first stiffness, one of said first and second modes being a default mode.

12. The unit of claim 11 further comprising an actuator for placing the gasket into a mode other than the default mode.

13. A unit for providing handsfree operation of a cellular telephone, the unit comprising:

a casing enclosing the unit;

a microphone mounted to the casing for receiving sound;

a first sound emitting element mounted to the casing for providing an audible alerting signal to a user and a second sound emitting element mounted to the casing for providing voice communication to the user, wherein the first sound emitting element and the second sound emitting element are a speaker;

a first port connectable to the cellular telephone, said first port including a power input for receiving power from the cellular telephone when connected to the cellular telephone; and a second port connectable to the cellular telephone, said second port for communicating received sound to the cellular telephone and receiving said voice communication from a connected cellular telephone, said second port also adapted to receive actuating signals for said first sound emitting element.

14. A communication unit comprising:

a microphone for receiving sound;

an indicator element connected to the microphone having a sound emitting element and a vibrating element, said vibrating element having active and inactive states;

a gasket between said microphone and said indicator element, said gasket having a first mode with a first stiffness and a second mode with a second stiffness greater than the first stiffness, one of said first and second modes being a default mode; and an actuator for placing said gasket in the mode other than the default mode responsive to the state of the vibrating element.

15. The unit of claim 14 wherein the gasket contains a rheological material.

16. The unit of claim 15 wherein the Theological material is an electro-rheological material and the actuator produces an electric current.

17. The unit of claim 15 wherein the rheological material is a magneto-rheological material and the actuator produces a magnetic field.

18. The unit of claim 14 wherein the default mode is the first mode of the gasket, and the actuator places the gasket in the other mode when the vibrating element is in its active state.

19. The unit of claim 14 wherein the default mode is the second mode of the gasket, and the actuator places the gasket in the other mode when the sound emitting element emits sound.

20. A communication unit comprising:

a microphone for receiving sound;

an indicator element connected to the microphone having a first sound emitting element, a second sound emitting element and a vibrating element, said first sound emitting element and vibrating element having active and inactive states;

a gasket between said microphone and said indicator element, said gasket having a first mode with a first stiffness and a second mode with a second stiffness greater than the first stiffness, one of said first and second modes being a default mode; and an actuator for placing said gasket in the mode other than the default mode responsive to the state of the vibrating element.

21. A method for protecting a microphone from vibrations of a sound emitting element, the method comprising the steps of:

responsive to a call alert signal, determining whether a mechanical alert is enabled, and if the mechanical alert is enabled, placing a mechanical connection between a microphone and a sound emitting element in a first stiffness and activating the mechanical alert, and if the mechanical alert is not enabled, placing the mechanical connection in a second stiffness less than the first stiffness and sending an audible signal to a first sound emitting element.

* * * * *

UNITED STATES PATENT AND TRADEMARK OFFICE
CERTIFICATE OF CORRECTION

PATENT NO.     : 6,266,542 B1
DATED          : July 24, 2001
INVENTOR(S)    : Trampas B. Stern and Matthew J. Murray Page 1 of 1

It is certified that error appears in the above-identified patent and that said Letters Patent is hereby corrected as shown below:

<u>Column 10,</u>
Line 22, delete "Theological" and insert -- rheological --.

Signed and Sealed this

Twenty-sixth Day of February, 2002

*Attest:*

*Attesting Officer*

JAMES E. ROGAN
*Director of the United States Patent and Trademark Office*